United States Patent [19]

Kong

[11] Patent Number: 4,830,226
[45] Date of Patent: May 16, 1989

[54] LIQUID DISPENSING APPARATUS

[76] Inventor: Cheung T. Kong, 2240 Roanoke Rd., San Marino, Calif. 91108

[21] Appl. No.: 106,711

[22] Filed: Oct. 8, 1987

[51] Int. Cl.⁴ ............................................. B67D 5/06
[52] U.S. Cl. .................................. 222/205; 222/207; 222/437
[58] Field of Search ........................ 222/205, 206–207, 222/211–212, 434, 437–438, 452–455, 457

[56] References Cited

U.S. PATENT DOCUMENTS

| | | | |
|---|---|---|---|
| 2,038,418 | 4/1936 | Conner | 222/454 |
| 2,387,374 | 10/1945 | Watters | 222/455 |
| 2,428,233 | 9/1947 | Livadas | 222/455 |
| 2,530,012 | 11/1950 | Gronemeyer et al. | 222/45 |
| 2,790,581 | 4/1957 | Harter | 222/455 |
| 2,887,254 | 5/1959 | Menderman | 222/454 X |
| 3,091,374 | 5/1963 | Schwartzman | 222/454 X |
| 3,141,585 | 7/1964 | Emmert | 222/454 X |
| 3,362,590 | 1/1968 | Martin | 222/548 X |
| 3,515,312 | 6/1970 | Heier | 222/437 X |
| 3,844,454 | 10/1974 | Buchtel | 222/453 |
| 4,143,794 | 3/1979 | Stratford et al. | 222/42 |
| 4,151,934 | 5/1979 | Saeki | 222/437 |
| 4,364,492 | 12/1982 | Kong | 222/205 |
| 4,474,312 | 10/1984 | Donoghue | 222/205 |
| 4,747,521 | 5/1988 | Saffron | 222/205 |

OTHER PUBLICATIONS

"The Repeater", Eppendorf Repeater Pipette brochure, 1 page.

Primary Examiner—Michael S. Huppert
Attorney, Agent, or Firm—Kelly, Bauersfeld & Lowry

[57] ABSTRACT

Apparatus for dispensing a measured amount of liquid from a container is adjustable for allowing different measured amounts of liquid to be dispensed from the same container. The apparatus is adaptable for use in the context of two-compartment, squeeze-type containers and two-compartment, inversion-type containers. The latter is a new type of container that allows a measured amount of liquid to be transferred from a storage compartment to a dispensing compartment without the need for an air vent to the outside of the container. The apparatus is designed so that additional liquid from the storage compartment is prevented from entering the dispensing compartment during dispensing of a measured amount of liquid from the container.

34 Claims, 8 Drawing Sheets

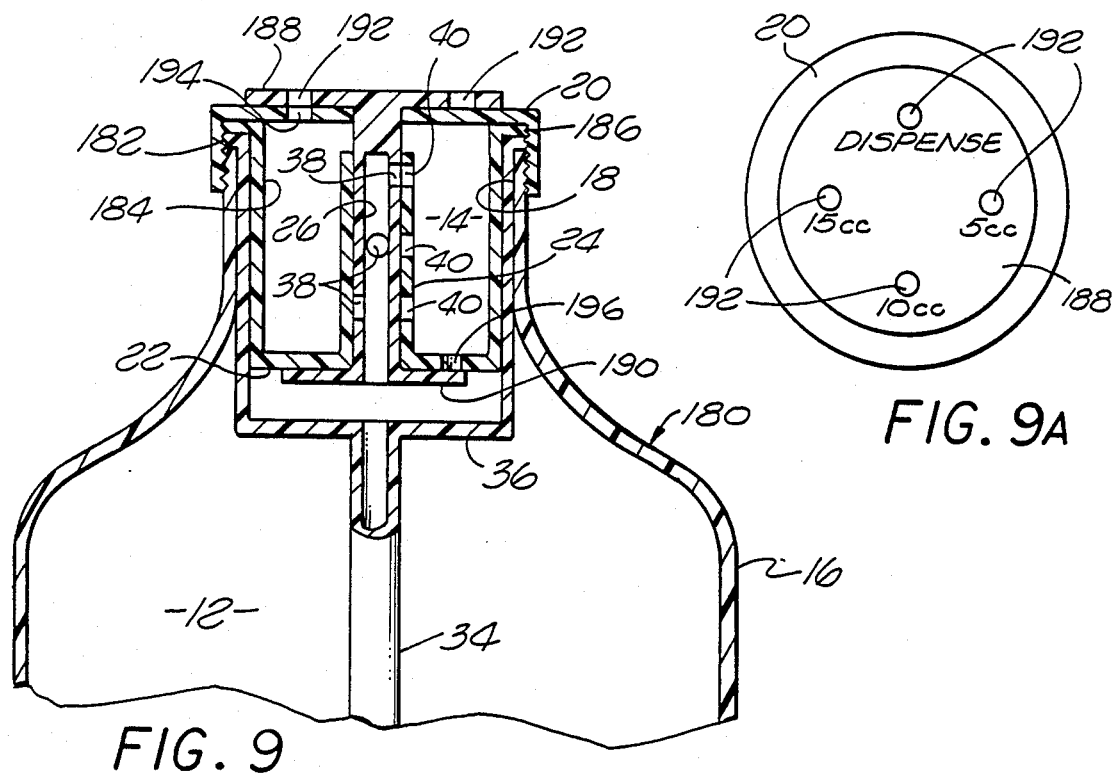
FIG. 9
FIG. 9A
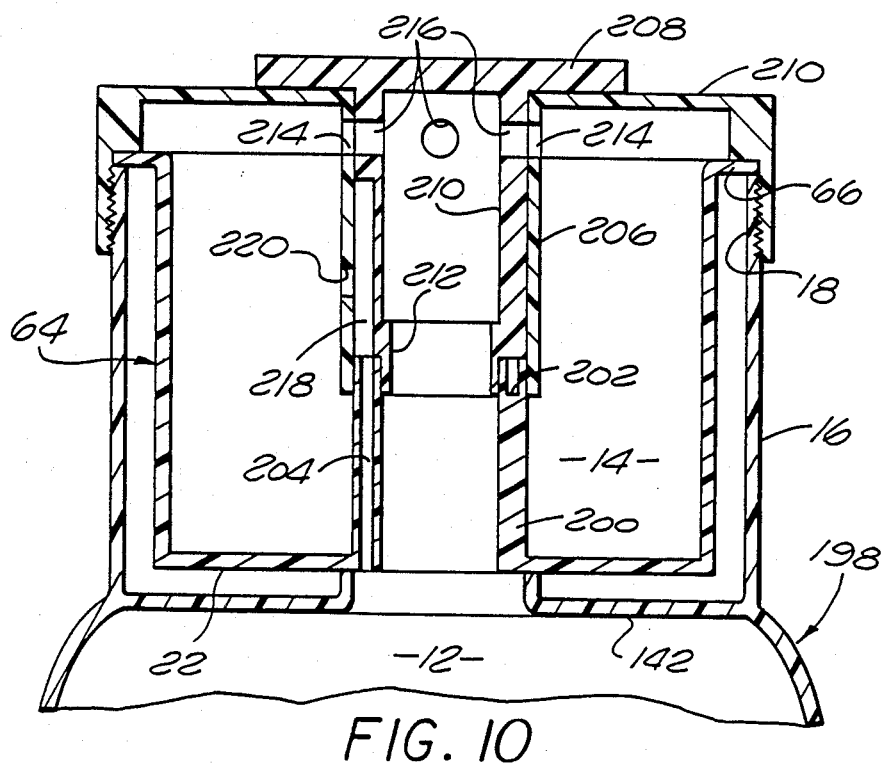
FIG. 10

LIQUID DISPENSING APPARATUS

FIELD OF THE INVENTION

The present invention is directed to apparatus for dispensing a measured amount of liquid from a container and, in particular, apparatus that is adjustable for allowing different measured amounts of liquid to be dispensed from the same container.

BACKGROUND OF THE INVENTION

It has long been necessary for people to dispense measured amounts of liquid, such as medicine, recipe ingredients or laundry detergents, from containers. Normally, this involves pouring the liquid from the container into a measuring spoon, a measuring cup or some other measuring device. Some containers even provide a cap that doubles as a measuring cup for the convenience of the user. However, these methods of dispensing measured amounts of liquid all rely upon the user to ensure the accuracy of the measurement. Thus, measurement accuracy varies widely depending upon the care taken by the user.

To provide more convenient and more accurate dispensing of measured amounts of liquid, a two-compartment container having a hollow tube connecting the two compartments was developed. In this type of container, a lower storage compartment holds the liquid stored in the container and an upper dispensing compartment is adapted to hold the measured amount of liquid to be dispensed from the mouth of the container. The hollow tube has an opening near the bottom of the storage compartment and extends up through this compartment and into the dispensing compartment. Another opening is located in the hollow tube at a desired height in the dispensing compartment.

To dispense liquid from the two-compartment container, pressure is applied to the lower compartment, usually by squeezing the outside of the container, so that liquid is forced up the hollow tube and into the dispensing compartment. An air vent must be provided in the dispensing compartment to allow air displaced by the liquid from the storage compartment to escape. Usually, this air vent is provided by loosening or removing the cap at the mouth of the container. Pressure is applied to the lower compartment until the liquid level in the dispensing compartment has risen above the upper opening in the hollow tube. Releasing the pressure exerted on the lower compartment causes the liquid above the upper opening in the hollow tube to be sucked back into the storage compartment.

After release of the pressure on the lower compartment, a measured amount of liquid remains in the dispensing compartment, the measured amount determined by the height of the upper opening in the hollow tube. This measured amount of liquid can then be dispensed from the upper compartment through the mouth of the container, usually by pouring. As long as the storage compartment is not squeezed during pouring, no liquid from the storage compartment will be dispensed through the upper opening in the hollow tube because of the partial vacuum present in the storage compartment. Thus, only the measured amount in the upper compartment should be dispensed. This same measured amount can be repeatedly dispensed from the upper compartment of the container by repeating the steps of squeezing, releasing and pouring in sequence.

An example of a two-compartment container that can function as described above is shown in U.S. Pat. No. 4,364,492 issued to the present inventor. Although this type of container can be used to dispense amounts of liquid less than the measured amount set by the upper opening in the hollow tube, it can only dispense one amount of liquid that is automatically measured by the container. Other two-compartment containers have been developed to allow adjustment of the measurement height. One variety is shown in U.S. Pat. No. 4,143,794 to Stratford et al. and another in U.S. Pat. No. 4,474,312 to Donoghue. These containers operate by providing a number of openings for the upper end of the hollow tube at various heights in the dispensing compartment. Means for selectively having one of these openings open with the remainder closed is also provided so that the measured amount of liquid that will be dispensed can be adjusted.

Prior art two-compartment containers have some problems. Excessive squeezing of the storage compartment can cause liquid to overflow the dispensing compartment through the required air vent. If the storage compartment is inadvertently squeezed during pouring, liquid will exit the upper opening of the hollow tube and throw off the amount of liquid to be dispensed. Accordingly, a container able to dispense measured amounts of liquid is needed that does not allow overflow during measurement of the liquid to be dispensed and does not allow additional liquid to enter the measured amount of liquid being dispensed so that measurement accuracy is maintained. This container should also be capable of being adjustable for allowing different measured amounts of liquid to be dispensed from the same container.

SUMMARY OF THE INVENTION

In accordance with the present invention, apparatus for dispensing a measured amount of liquid from a container has been provided. In one embodiment, the apparatus comprises: a storage compartment in the container capable of holding a volume of a liquid; a dispensing compartment in the container capable of holding at least the measured amount of liquid; means for causing a measured amount of liquid to flow from the storage compartment to the dispensing compartment; means for dispensing the measured amount of liquid from the dispensing compartment; and means for selectively preventing any remaining liquid in the storage compartment from flowing into the dispensing compartment during dispensing.

The means for causing the measured amount of liquid to flow can preferably comprise: a conduit in fluid communication with the storage compartment extending up into the dispensing compartment and having an opening therein at a predetermined height; means for selectively applying pressure to the storage compartment so that liquid is forced through the conduit and the opening therein into the dispensing compartment; and means for allowing air from the dispensing compartment displaced by the measured amount of liquid to vent from the container. Alternatively, the means for causing the measured amount of liquid to flow can comprise: means for allowing liquid to flow from the storage compartment to the dispensing compartment when the container is inverted; and means for allowing air to flow from the dispensing compartment to the storage compartment that is blocked by liquid when the measured amount of liquid has flowed into the dispensing compartment.

In a preferred embodiment, the means for dispensing comprises: an opening to the outside of the container provided in the dispensing compartment; and means for removably blocking the opening to the outside. The means for removably blocking the opening can be a screw cap, a flip top or a pull top in various more preferred alternative embodiments. The means for removably blocking the opening can also be a rotating dial with an opening therein that can be rotated into alignment with the opening in the dispensing compartment in yet another more preferred alternative embodiment.

In an alternate preferred embodiment, the means for dispensing comprises: an opening to the outside of the container through which the dispensing compartment can be removed from the container while containing the measured amount of liquid; and means for removably covering the opening to the outside.

Preferably, the means for selectively preventing any remaining liquid in the storage compartment from flowing comprises means for removably blocking the conduit in fluid communication with the storage compartment. Alternatively, the means for selectively preventing any remaining liquid in the storage compartment from flowing comprises means for removably blocking the means allowing liquid to flow and the means allowing air to flow or comprises means for positioning the means for allowing liquid to flow at a height in the dispensing compartment that will be above the measured amount of liquid and means for providing the means for allowing air to flow with a pathway for the air to flow that travels through a height relative to the dispensing compartment that will be above the measured amount of liquid.

In a second embodiment, the apparatus for dispensing a measured amount of liquid from a container comprises: a storage compartment in the container capable of holding a volume of liquid; a dispensing compartment in the container capable of holding at least the measured amount of liquid; means for allowing liquid to flow from the storage compartment to the dispensing compartment when the container is inverted; means for allowing air to flow from the dispensing compartment to the storage compartment that is blocked by liquid when the measured amount of liquid has flowed into the dispensing compartment; and means for dispensing the measured amount of liquid from the dispensing compartment.

Thus, a container has been provided that, in one embodiment, does not allow additional liquid to enter the measured amount of liquid being dispensed so that measurement accuracy is maintained and, in a second embodiment, does not allow overflow during measurement of the liquid to be dispensed. Both of these features can be combined in one container and these features are able to be combined with features allowing different measured amounts of liquid to be dispensed from the same container.

BRIEF DESCRIPTION OF THE DRAWINGS

FIG. 9 is a sectioned side view of an alternate embodiment for a squeeze-type container using liquid dispensing apparatus according to the present invention;

FIG. 9A is a top view of the container of FIG. 9;

FIG. 10 is a sectioned side view of an alternate embodiment for an inversion-type container using liquid dispensing apparatus according to the present invention;

DETAILED DESCRIPTION

Figure 1:
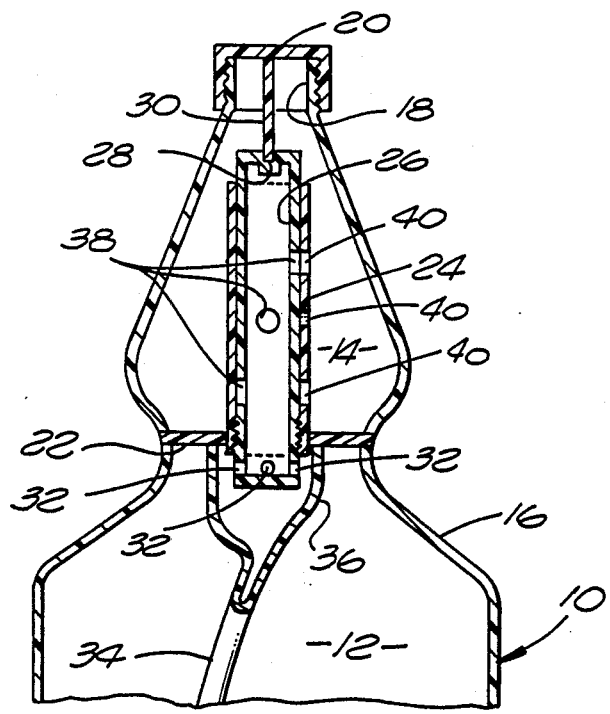
FIG. 1 is a sectioned side view of a squeeze-type container using liquid dispensing apparatus according to the present invention.

With reference to FIG. 1, A two-compartment squeeze-type container 10 is shown having a lower, storage compartment 12 and an upper, dispensing compartment 14. Container 10 has an outer wall 16 that is preferably made of a flexible plastic material so that pressure can be exerted on compartment 12 by squeezing outer wall 16. However, it should be understood that inflexible materials can be used for outer wall 16 if an alternate means for exerting pressure on compartment 12 is provided, such as a pump-action plunger. A threaded mouth 18 is provided at the top of container 10 through which liquid held in the container can be dispensed. This mouth opens directly into compartment 14. Screw cap 20 fits over mouth 18 to seal the container.

Although the general term "liquid" will be used to describe the contents of the containers, this term should not be narrowly construed. It should be understood that the term "liquid" includes dispersions or slurries where a solid is dispersed in a liquid medium. In fact, powder or crystal granules can flow like a liquid under certain circumstances so that certain embodiments of the present invention, such as those shown in FIGS. 3A, 3B and 3C, could work with powder or crystal granules. Therefore, the term "liquid" should also be understood as including powder or crystal granules.

Container 10 is divided into two compartments by a separating wall 22 that extends inwardly from outer wall 16. Wall 22 has a central opening with a hollow cylinder 24 affixed therein. Cylinder 24 extends upward from the surface of wall 22 at roughly a right angle into compartment 14. This cylinder is open at both ends and has an internal threaded section at the point where it is affixed to wall 22. A hollow cylinder 26 is threadably received within cylinder 24 and is slightly longer than cylinder 24. Cylinder 26 is closed at both ends.

The top end of cylinder 26 has a rectangular indentation 28 extending across it for receiving a prong 30 extending downward from and affixed to the lower surface of cap 20. This prong ensures that cap 20 and cylinder 26 can be turned in unison. Openings 32 are located about the periphery of cylinder 26 adjacent the lower end of the cylinder. These openings allow liquid to enter cylinder 26 from outside the cylinder when cylinder 26 is positioned so that openings 32 are located below the bottom edge of cylinder 24.

A hollow tube 34 is provided in compartment 12. This tube is open at its lower end and extends up from the bottom of container 10 to an enlarged portion 36. Enlarged portion 36 surrounds and encloses the lower sections of cylinders 24 and 26 where they extend through wall 22. The top end of tube 34 at enlarged portion 36 is attached to the lower surface of wall 22. When pressure is exerted on compartment 12, the liquid held in compartment 12 is forced up tube 34 through its open end and into cylinder 26 if openings 32 are properly located.

Depending upon the positioning of cylinder 26, liquid forced into cylinder 26 can exit the cylinder through any one of a number of holes 38 located in the wall of the cylinder. Holes 38 are located at different heights in the wall of the cylinder, each height corresponding to a different measured amount of liquid, and at different circumferential positions around the cylinder so as to form a spiral pattern. Which hole 38 liquid will be able to exit through depends upon the position of cylinder 26 within cylinder 24. Cylinder 24 has a series of holes 40 located in its wall. Holes 40 are located in cylinder 24 at heights that correspond to the heights of holes 38 in cylinder 26, but holes 40 are lined up at the same circumferential position on cylinder 24 so as to be aligned vertically along the wall of cylinder 24. Thus, rotating cylinder 26 within cylinder 24 allows one of the holes 38 to overlap one of the holes 40 while the other holes are blocked and will not allow liquid to pass through into compartment 14.

To dispense a measured amount of liquid from container 10, cap 20 is first twisted off until air can escape from mouth 18. This provides the air vent necessary to allow, air displaced by liquid entering compartment 14 to escape through the mouth 18. Without such an air vent it would become increasingly difficult to force liquid into compartment 14. However, cap 20 is not removed entirely from the bottle, whereby the cylinder 26 remains rotatable within the cylinder 24. Instead, after the air vent has been created, cap 20 is twisted further until the hole 38 corresponding to the desired measurement height lines up with one of the holes 40. Cylinder 26 is rotated within cylinder 24 when cap 20 is twisted by virtue of prong 30. As cap 20 is threaded off, cylinder 26 is threaded upwardly with respect to cylinder 24.

Openings 32 in cylinder 26 should be located so that, even though cylinder 26 is threaded upwardly with respect to cylinder 24, these openings are not completely covered until cap 20 is twisted entirely off. Thus, when cap 20 is twisted to a point where one of the holes 38 is lined up with one of the holes 40, openings 32 will still allow liquid to pass into cylinder 26. Once cylinder 26 has been positioned for the desired measurement height, compartment 12 is squeezed to force liquid up tube 34, into cylinder 26 and then into compartment 14 through the aligned set of holes 38 and 40.

Compartment 12 is squeezed until liquid has filled compartment 14 to a point above the aligned set of holes. Pressure on compartment 12 is then released so that liquid in compartment 14 above the aligned set of holes is sucked back into compartment 12. This leaves a measured amount of liquid remaining in compartment 14. Cap 20 can then be twisted all the way off so that this measured amount of liquid can be dispensed through mouth 18 by tipping container 10. Twisting cap 20 all the way off moves cylinder 26 upward in cylinder 24 to a point where openings 32 are covered. With openings 32 covered, liquid from compartment 12 cannot enter compartment 14 while the measured amount of liquid is being dispensed through mouth 18, even if container 10 is inadvertently squeezed.

FIG. 1 depicts a preferred embodiment of apparatus for dispensing a measured amount of liquid adapted for use in the context of two-compartment, squeeze-type containers. This preferred embodiment can be varied in many ways without departing from the spirit of the present invention. However, each of these variations on the preferred embodiment described will have a means for preventing liquid from the storage compartment entering the dispensing compartment during dispensing.

Figure 2:
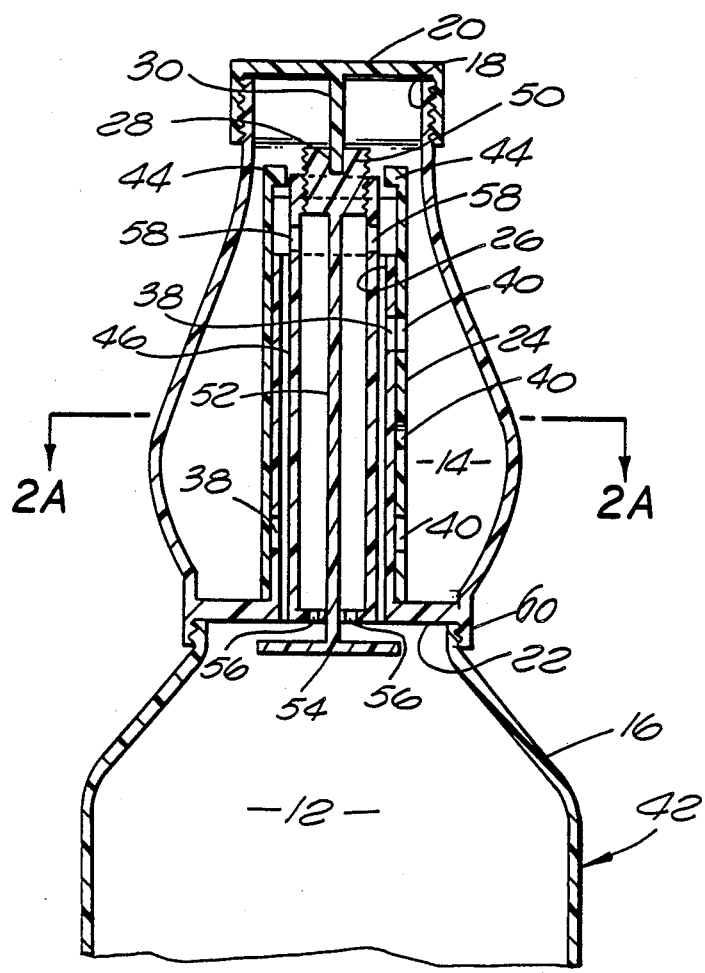
FIG. 2 is a sectioned side view of an inversion-type container using liquid dispensing apparatus according to the present invention.

With reference to FIG. 2, a two-compartment inversion-type container 42 is shown having a number of features similar to those of container 10. These similar features are designated with the same numbers as used in the description of container 10. However, not all of these features function in an identical fashion. For example, wall 16 of container 42 is preferably made of a sturdy, lightweight material but it is not important that this material be flexible because compartment 12 need not have pressure exerted on it during the operation of container 42. Thus, wall 16 can be made of glass, ceramic, metal or other relatively inflexible materials.

Mention will be made of any differences in function for these similar features. This particular inversion-type container is best used for thinner, less viscous liquids.

As with container 10, container 42 is divided into two compartments, a lower storage compartment 12 and an upper dispensing compartment 14, by a separating wall 22 that extends inwardly from outer wall 16. However, inner cylinder 26 is affixed to and extends upward from the surface of wall 22 at roughly a right angle into compartment 14. Outer cylinder 24 is slidably received over cylinder 26 and rests upon the top surface of wall 22. Tabs 44 extend upward and inward from the top edge of cylinder 24 to provide a means whereby cylinder 24 can be rotated with respect to cylinder 26. Holes 38 and holes 40 are located in cylinder 26 and cylinder 24, respectively, and are arranged similarly to their counterparts in container 10. The only difference in the operation of aligning these holes and the operation of aligning their counterparts resides in which set of holes remains fixed and which set of holes is rotated so that one of its members aligns with one of the members of the set of fixed holes. In container 10, holes 40 remain fixed and holes 38 can be rotated. The opposite is true for container 42, holes 38 remain fixed and holes 40 can be rotated.

Figure 2A:
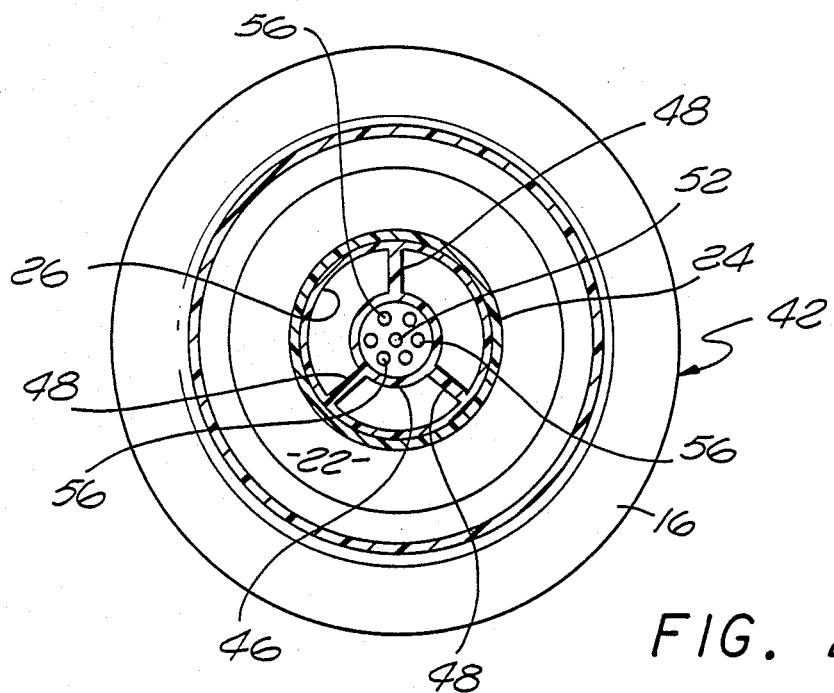
FIG. 2A is a sectioned top view of the container of FIG. 2 along the line 2A—2A.

Screw cap 20 fits over mouth 18 to seal container 42. A prong 30 extends downward from and is affixed to the lower surface of cap 20. As with container 10, prong 30 serves to operate a means for preventing liquid from the storage compartment entering the dispensing compartment during dispensing. However, a different such means is used with container 42. A hollow cylinder 46 is positioned concentrically within and spaced apart from cylinder 26. Cylinder 46 is attached to cylinder 26 by a trio of walls 48 (FIG. 2A) that extend between the outer surface of cylinder 46 and the inner surface of cylinder 26 at points equally spaced about the periphery of cylinder 46.

Cylinder 46 is open at its top end but its inner surface is threaded adjacent the top edge to receive a threaded plug 50. The top surface of plug 50 has a rectangular indentation 28 extending across it for receiving the prong 30. Thus, plug 50 will turn in unison with cap 20. A cylindrical rod 52 extends downward from the center of the lower surface of plug 50. This rod extends down through the closed lower end of cylinder 46 and into compartment 12. A disc 54 is greater than the inner diameter of cylinder 26.

The lower end of cylinder 26 is open and forms a central opening in wall 22. This central opening is partially filled by the closed lower end of cylinder 46. However, open areas exist between the inner surface of cylinder 26 and the outer surface of cylinder 46. In addition, openings 56 are provided in the lower end of cylinder 46 to allow liquid to flow from compartment 12 into cylinder 46. Openings 58 in the wall of cylinder 46 just below the threaded section adjacent the top edge allow liquid to exit cylinder 46 into compartment 14.

To dispense a measured amount of liquid from container 42, cylinder 24 is first rotated to a position where one of the holes 40 is aligned with one of the holes 38. Cylinder 24 can be rotated by removing cap 20 and twisting tabs 44. Tabs 44 can be twisted by fingertip or through the use of some hand held implement. Cap 20 is then replaced and tightened down. No air vent is needed to operate container 42. Inverting container 42 with the cap on causes air in compartment 14 to exchange with liquid in compartment 12. Air will move through the aligned holes and out the space between cylinders 26 and 46 into compartment 12. Liquid will move through openings 56 into cylinder 46 and then out openings 58 into compartment 14.

Air and liquid will continue to exchange until the liquid level in inverted compartment 14 rises to cover the aligned holes. Once the aligned holes are covered, no more liquid will enter compartment 14. Thus, the height of the aligned holes when container 42 is inverted sets the liquid measurement. Aligning the top two holes in the upright position produces the lowest liquid measurement while aligning the bottom two holes in the upright position produces the highest liquid measurement. Markings can be placed on container 42 to line tabs 44 up with and eliminate any confusion on the liquid measurement that will result from a particular alignment.

Once the liquid level has stabilized in compartment 14, container 42 is flipped back to the upright position. With properly sized openings, the liquid in compartment 14 will remain there and will not flow back into compartment 12 through the openings provided because of the cohesiveness of the liquid. The size of the openings will depend upon the properties, such as viscosity, of the liquid involved. However, if container 42 is squeezable and the aligned holes end up below the liquid level when the container is returned to the upright position, putting pressure on compartment 12 will force air and liquid to exchange and lower the liquid level in compartment 14 to the aligned holes. This could be used as an alternate approach to attaining a measured amount of liquid but it would be limited to measured amounts less than half the volume of compartment 14. Therefore, for this specific embodiment, it is preferred that container 42 be formed so that no pressure can be placed on compartment 14. This prevents inadvertent loss of liquid from compartment 14 after container 42 has been returned to the upright position.

To dispense the measured amount of liquid from compartment 14 after container 42 is returned to the upright position, cap 20 is removed. Turning cap 20 to remove it turns plug 50 and moves disk 54 up against wall 22. This blocks the central opening in wall 22 and openings 56 so that no liquid from compartment 12 can enter compartment 14 during dispensing. Container 42 can then be tipped over to dispense the measured amount of liquid through mouth 18. Alternatively, container 42 can be separated into two parts that are threaded together at threaded connection 60 located just below wall 22. This threaded connection allows compartment 14 to be separated from compartment 12 and used like a cup. Reconnection of the two parts of container 42 and replacement of cap 20 readies the container for another measurement cycle. Before replacing cap 20, tabs 44 can be manipulated to another measurement setting if desired.

FIG. 2 depicts a preferred embodiment of apparatus for dispensing a measured amount of liquid adapted for use in the context of a new container type, a two-compartment, inversion-type container. This preferred embodiment can be varied in many ways without departing from the spirit of the present invention. The embodiments of FIG. 1 and FIG. 2 represent the application of the present invention to two different container types. FIGS. 3 through 11A depict a number of possible variations that can be made to these two applications of the present invention. Features of theses variations similar to features of the embodiments of FIG. 1 and/or FIG. 2 will be designated with the same number to help show the correspondence between these embodiments and their variations. Different features will be designated with new numbers and described in greater detail.

Figure 3:
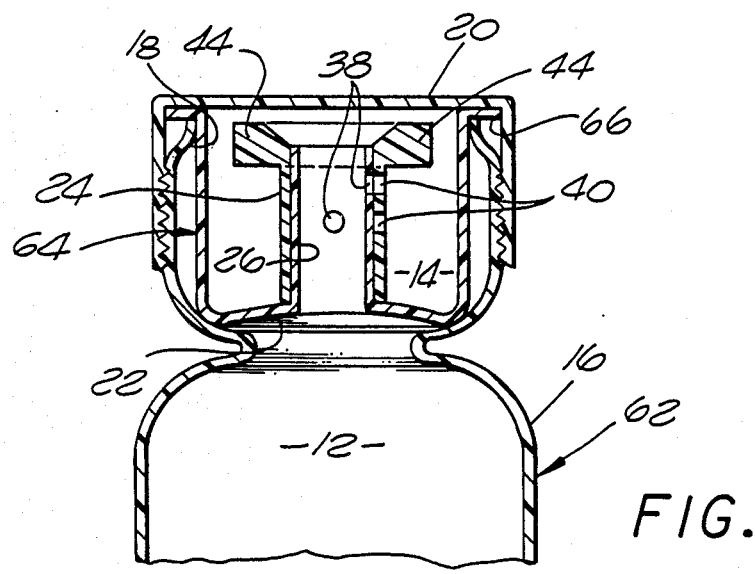
FIG. 3 is a sectioned side view of an alternate embodiment for an inversion-type container using liquid dispensing apparatus according to the present invention.

With reference to FIG. 3, a container 62 is shown that is a variation on the two-compartment, inversion-type container of FIG. 2. Unlike container 42, container 62 has a wide mouth 18 with a removable cup 64 inserted therein. Cup 64 has a lip 66 extending around its top edge that rests on the top edge of mouth 18. Screw cap 20 fits down over lip 66 and holds cup 64 in place when it is threaded down. The interior of cup 64 forms compartment 14 and the bottom surface of cup 64 forms wall 22. The bottom surface of cup 64 has a central opening therein from which cylinder 26 extends upward. Cylinder 24 with tabs 44 at the top fits down over cylinder 26 and can be rotated around cylinder 26 for alignment of one of holes 40 with one of holes 38. Holes 38 and 40 are arranged much like the sets of holes in the embodiments of FIGS. 1 and 2.

The design of container 62 has been simplified by leaving out the central cylinder found in container 42. In container 62, cylinder 26 is large enough in diameter to allow air and liquid to exchange when the container is inverted. However, it is also large enough in diameter to allow air and liquid to exchange when the container is returned to the upright position. Therefore, container 62 can only be used to deliver measured amounts of liquid up to about half the volume of compartment 14. This allows the measured amount of liquid to be trapped in the bottom of cup 64 when container 62 is returned to its upright position.

As an alternative construction, cylinder 26 can be provided with a separate air passage. This could take the form of a hollow cylindrical tube open at both ends and extending along the length of cylinder 26 and attached to the wall of the cylinder. This tube would be attached to the cylinder wall at a position where it would not block any holes. For certain types of liquid, it has been found to be beneficial to provide such a separate air passage.

Once container 62 has been returned to its upright position with a measured amount of liquid in compartment 14, cap 20 is removed and cup 64 lifted out and used to dispense the measured amount of liquid. Lip 66 extends out over the top edge of mouth 18 to provide a hand hold that allows cup 64 to be removed from container 62. The lower surface of cup 64 fits snuggly against wall 16 around its periphery when cup 64 is in place in container 62 so that the sides of cup 64 stay dry. This allows a user to handle the sides of cup 64 during dispensing without getting liquid on his or her fingers.

Figure 3A:
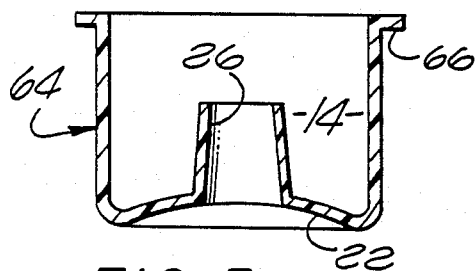
FIG. 3A is a sectioned side view of alternate liquid dispensing apparatus for use with the container of FIG. 3 for one measured amount.
Figure 3B:
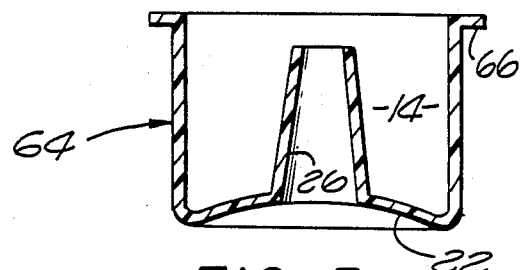
FIG. 3B is a sectioned side view of alternate liquid dispensing apparatus like that of FIG. 3A for a different measured amount.

With reference to FIGS. 3A and 3B, a further simplification in the design of a two-compartment, inversion-type container is depicted. This design is based upon container 62 shown in FIG. 3. Rather than having cylinder 24 and sets of holes 38 and 40 to adjust the measured amount of liquid, a set of cups 64 could be provided for container 62. Each cup would have a cylinder 26 with a different height. When container 62 was inverted, liquid would fill compartment 14 until the level had risen to a point where the top opening of cylinder 26 was covered. Thus, the cup of FIG. 3A would deliver a measured volume of liquid greater than that delivered by the cup of FIG. 3B. Changing the measured amount of liquid would be accomplished by changing the cup inserted into container 62. However, as with the design of FIG. 3, only measured amounts of liquid up to about half the volume of compartment 14 could be delivered.

Figure 3C:
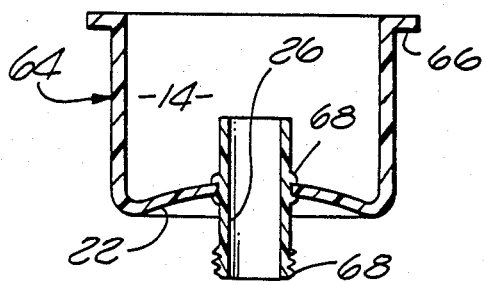
FIG. 3C is a sectioned side view of alternate liquid dispensing apparatus for use with the container of FIG. 3 that is adjustable to two different measured amounts.

With reference to FIG. 3C, a further refinement of cup 64 is depicted. In this design, a cylinder 26 is slidably received in the central opening in the bottom of cup 64. Pairs of raised ribs 68 extend around the outer surface of cylinder 26 at various heights so that cylinder 26 can be set to extend upward into compartment 14 various heights. The raised ribs of a pair are spaced apart such that they will rest just on either side of the bottom of cup 64 when cylinder 26 is slid to a particular height. The raised ribs extend outwardly far enough to provide a seal at the interface of cylinder 26 and cup 64 when a pair are positioned just on either side of the bottom of cup 64. However, the raised ribs do not extend outwardly so far as to prevent cylinder 26 from being slid into position.

Thus, using a cup 64 as depicted in FIG. 3C allows selection of the measured amount of liquid to be dispensed through positioning of cylinder 26. The higher cylinder 26 extends up into compartment 14, the lower the measured amount of liquid. Although only measured amounts of liquid up to about half the volume of compartment 14 could be delivered, it should be understood that a number of pairs of raised ribs could be provided on the outer surface of cylinder 26 to allow for dispensing of a number of different measured amounts of liquid.

It should be clear that the slide adjustment approach taken by the cup depicted in FIG. 3C can be practiced in a number of ways. That is, many ways are available for adjusting the volume below the top opening of cylinder 26 when container 62 is inverted. For example, cap 20 can be adapted to have a telescoping top surface so that the cap can be slide adjusted to vary the volume below cylinder 26. With such a cap design, no height adjustment would be needed for cylinder 26. Alternatively, cylinder 26 can have a telescoping construction so that it can be extended upwardly to varying heights for measurement adjustment.

The designs of FIGS. 3A, 3B and 3C, in particular, can be used with containers holding powder or crystal granules. The large openings used to set measurement height would allow powder or crystal granules to flow freely from compartment 12 to compartment 14. Thus, measured amounts of these materials could then be dispensed.

Figure 3D:
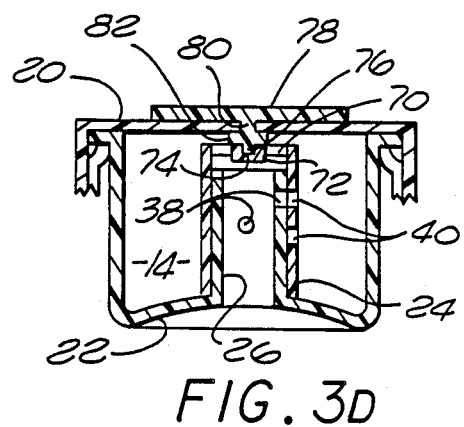
FIG. 3D is a sectioned side view of alternate liquid dispensing apparatus having an external dial for selecting between two different measured amounts for use with a container like that of FIG. 3.

With reference to FIG. 3D, a modification of container 62 is shown that provides an alternate means for alignment of one of holes 40 with one of holes 38. This alternate means allows for adjustment of the liquid measurement height without the removal of cap 20. Instead of having tabs 44 at the top, cylinder 24 has a trio of inwardly extending support members 70 that support a central plug 72. Support members 70 are spaced from one another so that liquid can still exit the top of cylinder 24. Central plug 72 has a rectangular notch 74 in its upper surface for receiving a tab 76 that is connected to a circular dial 78.

Dial 78 rests on the upper surface of cap 20 and has a cylindrical rod 80 extending downward through an opening in the center of cap 20. Just below the lower surface of cap 20, rod 80 expands outwardly into a sealing disk 82. Sealing disk 82 prevents liquid from escaping from container 62 through the opening in the center of cap 20. Tab 76 extends downward from the lower surface of disk 82 and is received by notch 74. Spinning dial 78 on top of cap 20 turns cylinder 24 with respect to cylinder 26 and allows a measurement height to be selected. Appropriate markings can be provided on cap 20 and disk 82 to aid in the proper alignment of holes for a desired measurement height.

Figure 4:
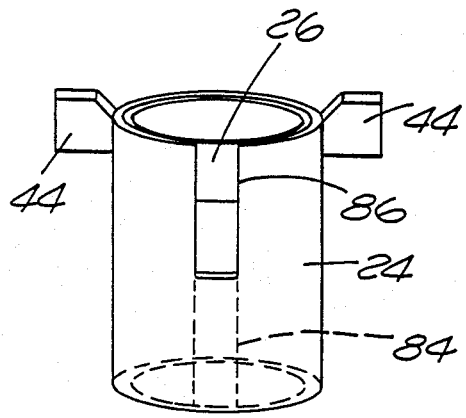
FIG. 4 is a pictorial view of an alternate means for adjusting to different measured amounts for use with the liquid dispensing apparatus of FIG. 3.
Figure 4A:
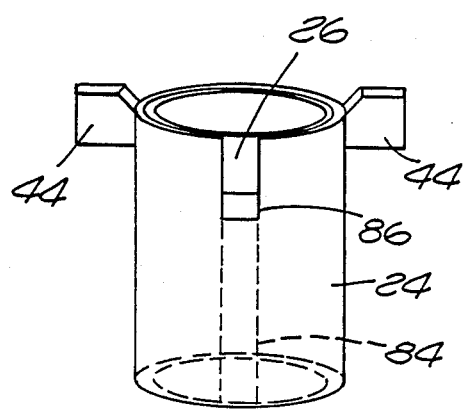
FIG. 4A is a pictorial view of the means of FIG. 4 set to a different measured amount.

With reference to FIGS. 4 and 4A, a modification of cylinders 24 and 26 is shown that provides a different means for establishing a measurement height. Instead of having holes 38 provided therein, cylinder 26 has a single rectangular opening 84 provided in its side. This rectangular opening extends up to a point equal to the point where the top hole of the holes 38 would have been located. Instead of having holes 40 provided therein, cylinder 24 has a number of rectangular openings 86 extending down from its top edge. These rectangular openings are located at different points around the periphery of cylinder 24 and each extends downward to a different depth.

When cylinder 24 is turned so that one of the rectangular openings 86 is lined up with the rectangular opening 84, a pathway through cylinders 24 and 26 is provided where the rectangular openings overlap. The amount of overlap will depend on the depth of the rectangular opening 86. However, for each opening 86 there should be some overlap when it is lined up with opening 84 so that air can escape through the pathway created by the overlap when container 62 is inverted. The measurement height is set by the depth of the opening 86 that is lined up with opening 84. When container 62 is inverted, liquid will fill compartment 14 until the liquid level rises to the lower edge of the aligned rectangular opening 86.

Figure 5:
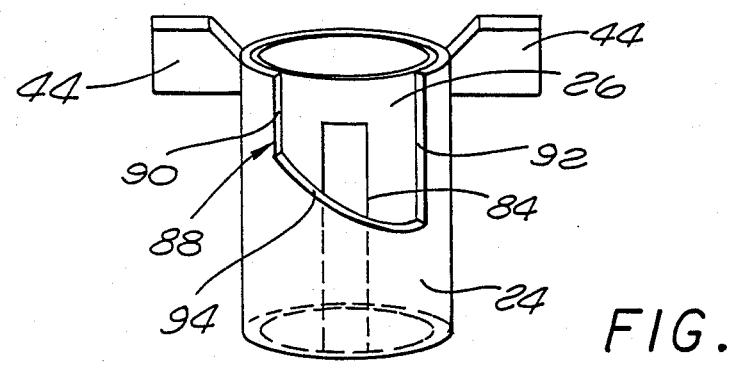
FIG. 5 is a pictorial view of another alternate means for adjusting to different measured amounts for use with the liquid dispensing apparatus of FIG. 3.

With reference to FIG. 5, a further modification of cylinder 24 is shown that provides yet another means for establishing a measurement height. Cylinder 26 is provided with a single rectangular opening 84 just as in the modification depicted in FIGS. 4 and 4A. Cylinder 24, however, has a single, wide opening 88 extending down from its top edge rather than a number of rectangular openings. Opening 88 has a short side edge 90 extending down from the top edge of cylinder 24 and a long side edge 92 also extending down from the top edge of cylinder 24 to form the opposite side of the opening. A bottom edge 94 slopes between edges 90 and 92 to form the bottom of opening 88.

A pathway is formed through cylinders 24 and 26 when cylinder 24 is turned so that part of opening 88 overlaps opening 84. The amount of overlap depends on whether that part of opening 88 that is lined up with opening 84 is closer to short side edge 90 or long side edge 92. The measurement height also depends on which part of opening 88 is lined up with opening 84. The measurement height increases gradually as the part of opening 88 that is lined up with opening 84 moves from short side edge 90 toward long side edge 92. The configuration of opening 88 allows for an infinite number of measurement heights to be selected between the minimum and maximum measurement heights. The openings of FIGS. 4, 4A and 5 may also be easier to fabricate than the holes 38 and 40. Although these opening configurations have been described in the context of container 62, it should be understood that they can be adapted for use with a wide variety of container designs, including other containers described herein.

Figure 6:
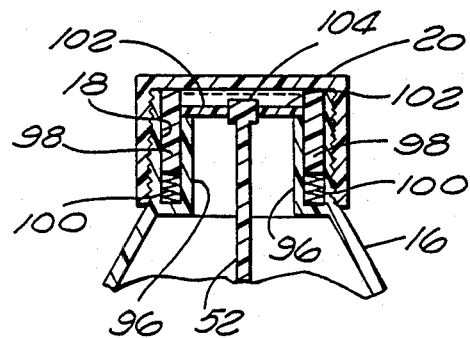
FIG. 6 is a sectioned side view of an alternate valve closing means for use with the liquid dispensing apparatus of FIG. 2.

With reference to FIG. 6, a modification of container 42 is shown which provides an alternative means for moving disk 54 up against wall 22 to block the central opening in wall 22 and openings 56 so that no additional liquid will enter compartment 14 during dispensing. In this design, a pair of wells 96 are located opposite each other on the inner surface of mouth 18 and receive a pair of pistons 98. Beneath each piston at the bottom of each piston's well is a coil spring 100 that tends to urge each piston upward out of its well. However, when cap 20 is tightened down, the top surfaces of the pistons contact the lower surface of the cap holding the pistons in place in their wells against the urgings of the coil springs.

A pair of support members 102 are attached to the pistons and extend inwardly to attach to and provide support to a central plug 104. Cylindrical rod 52 is attached to the lower surface of plug 104 and extends downward to disk 54. With cap 20 tightened down, pistons 98 are held down and disk 54 is held away from wall 22. This allows air and water to exchange during inversion of the container. When the container is returned to its upright position and cap 20 removed for dispensing the measured amount of liquid, pistons 98 are free to move upward and move disk 54 into contact with wall 22. Pistons 98 are prevented from fully leaving wells 96 by disk 54 contacting wall 22. Support members 102 are narrow enough to allow free flow of liquid out of mouth 18.

Figure 6A:
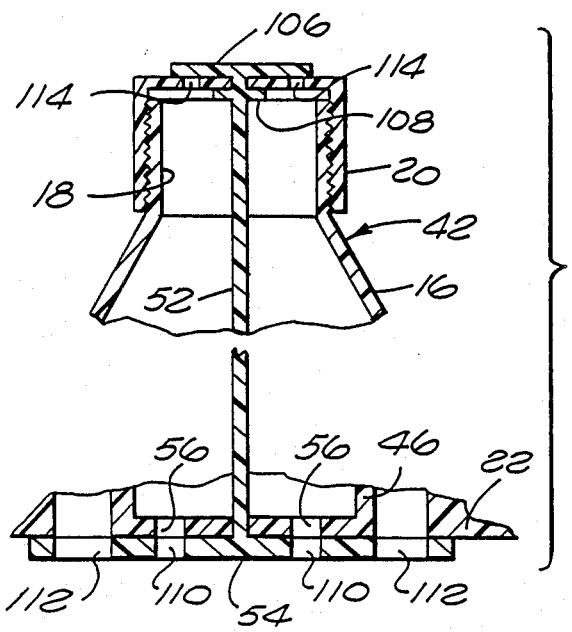
FIG. 6A is a sectioned side view of an alternate valve closing means and container opening means for use with the liquid, dispensing apparatus of FIG. 2.

With reference to FIG. 6A, another modification of container 42 is shown which provides yet another means to block the central opening in wall 22 and openings 56 so that no additional liquid will enter compartment 14 during dispensing. A flat, circular dial 106 rests on the top surface of cap 20. Cylindrical rod 52 extends down from the center of the lower surface of dial 106 through a central opening in cap 20. Just below the inside surface of cap 20, rod 52 expands into disk 108. This disk acts to hold dial 106 in place on the cap and to seal the cap against liquid leakage.

Disk 54 is attached to the lower end of rod 52 so that it is positioned just below and in contact with wall 22. Circular openings 110 are provided in disk 54 that will align with openings 56 in the bottom of cylinder 46 when disk 54 is rotated to particular positions. Arcuate openings 112 are also provided in disk 54 that will align with arcuate openings in the space between cylinder 46 and cylinder 26 when disk 54 is positioned so that openings 110 and 56 are aligned. Openings 56 are spaced apart from one another such that disk 54 can be positioned so that openings 110 are entirely between openings 56 and do not overlap with openings 56 at all. The arcuate openings at the lower end of the space between cylinder 46 and cylinder 26 are similarly spaced with respect to openings 112. This means that segments of the central opening in wall 22 between cylinder 46 and cylinder 26 have to be blocked off to form arcuate openings.

Turning dial 106 will turn disk 54. Thus, from the outside of container 42, disk 54 can be moved between a position where its openings are aligned with openings 56 and the arcuate openings in wall 22 and a position where these openings are not aligned and, instead, are blocked. Markings can be placed on cap 20 and dial 106 to help a user of container 42 to align these openings for inversion of the container and then block these openings for dispensing liquid from compartment 14. Blocking the openings during dispensing prevents additional liquid from entering compartment 14 during dispensing.

Dial 106 has circular openings (not shown) therein that will align with circular openings 114 in cap 20 when the openings associated with disk 54 are blocked. This allows liquid to be dispensed through openings 114 by tipping container 42. Openings 114 are spaced apart from each other such that when the openings associated with disk 54 are unblocked, openings 114 will be blocked by dial 106. Thus, container 42 can be inverted to allow air and liquid to be exchanged between compartments 12 and 14 without liquid leaking out cap 20 through openings 114.

Figure 6B:
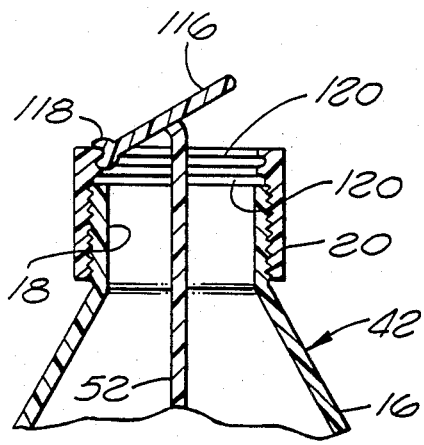
FIG. 6B is a sectioned side view of an alternate container opening means for use with the liquid dispensing apparatus of FIG. 2.

With reference to FIG. 6B, another variation on container 42 is depicted which provides a further alternate means for moving disk 54 up against wall 22 to block the central opening in wall 22 and openings 56 so that no additional liquid will enter compartment 14 during dispensing. In this variation, cap 20 is provided with a flip top 116 that flips upward from cap 20 about hinge 118 to allow liquid to be poured from the container. Cylindrical rod 52 is attached to the undersurface of flip top 116 and extends down to disk 54. When flip top 116 is pressed down between ridges 120 to seal the top surface of cap 20, disk 54 is held away from wall 22 to allow air and water exchange during inversion. When flip top 116 is pulled up, disk 54 is moved up against wall 22 to block the openings in wall 22.

Figure 6C:
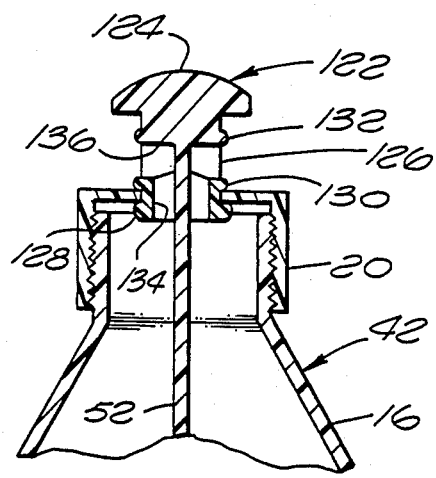
FIG. 6C is a sectioned side view of another alternate container opening means for use with the liquid dispensing apparatus of FIG. 2.

With reference to FIG. 6C, yet another variation on container 42 is shown having another alternate means for moving disk 54 up against wall 22 to block the openings in wall 22 to prevent additional liquid from entering compartment 14 during dispensing. This variation uses a pull top 122 mounted in a central opening in the top surface of cap 20. Pull top 122 has a circular head 124, with a diameter wider than that of the central opening in cap 20, mounted on a cylindrical body 126 that is slidably received within the central opening in cap 20. A bottom rib 128 extends outward from the outer wall of body 126 adjacent the lower end of the body to hold the pull top within the central opening in the cap.

A lower rib 130 extends outward from the outer wall of body 126 and is positioned so that it will rest just above the top surface of cap 20 when the pull top has been pulled all the way up. Rib 130 extends outward far enough to provide a way of keeping the pull top in an up position but not far enough to prevent the pull top from being slid down. An upper rib 132 extends outward from the outer wall of body 126 and is positioned so that it will rest just below the top surface of cap 20 when the pull top has been pushed down so that head 124 rests on the cap. Rib 132 extends outward to the same diameter as rib 130. Thus, means are provided for temporarily locking the pull top in an up or a down position.

A cylindrical passageway 134 extends vertically upward from the bottom surface of body 126 until it intersects a cylindrical passageway 136 extending horizontally across the body between ribs 130 and 132. When pull top 122 is up, these passageways provide a means for liquid to be dispensed from the container. Rod 52 is attached to the pull top at the wall of passageway 136 so that it extends down through the center of passageway 134 down to disk 54. When pull top 122 is down, disk 54 is held away from wall 22 to allow air and water exchange during inversion. When pull top 122 is up, disk 54 is moved up against wall 22 to block the openings in wall 22.

Figure 7:
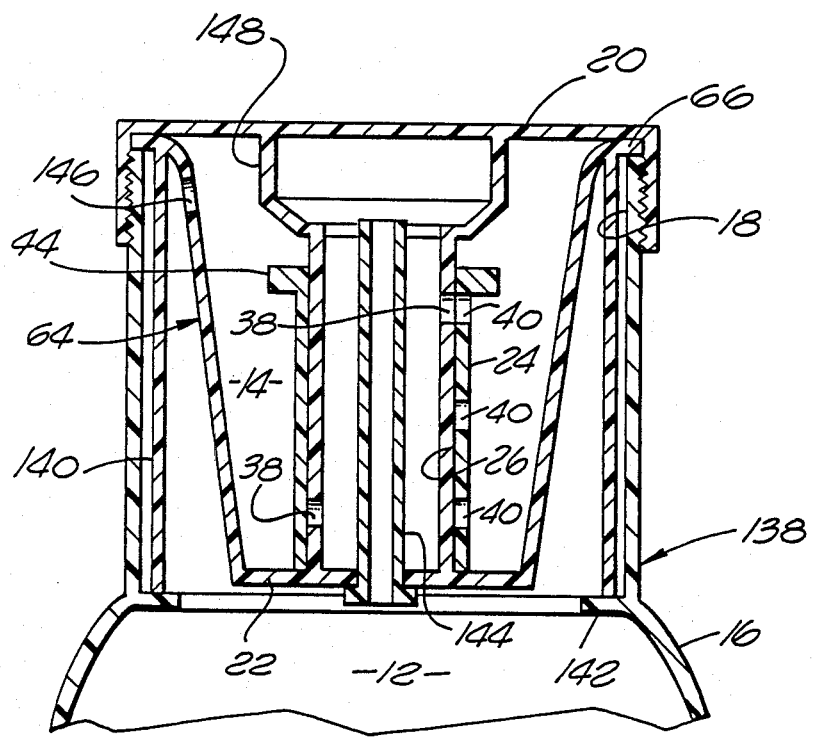
FIG. 7 is a sectioned side view of an alternate embodiment for an inversion-type container using liquid dispensing apparatus according to the present invention.
Figure 8:
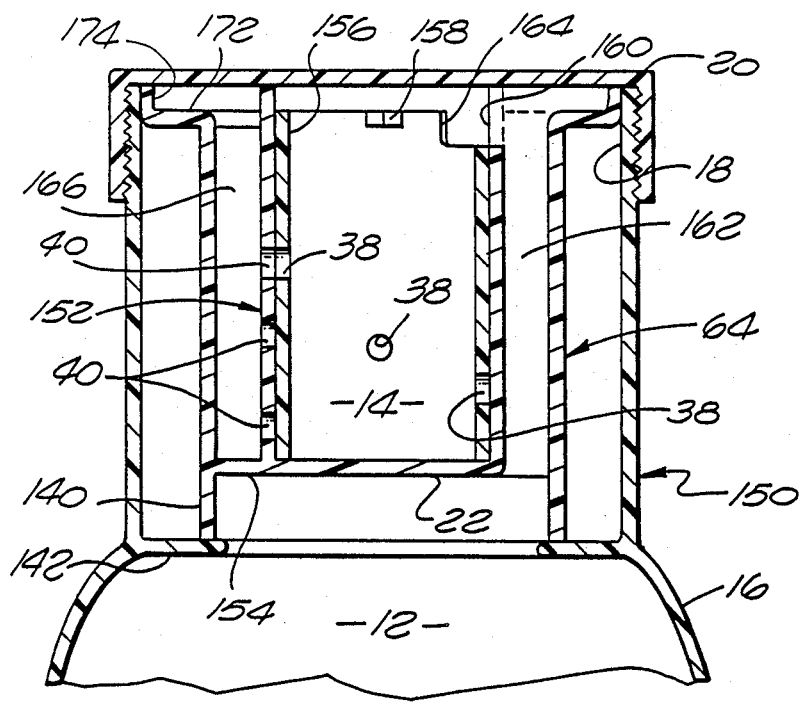
FIG. 8 is a sectioned side view of alternate liquid dispensing apparatus for use with the container of FIG. 7.
Figure 8A:
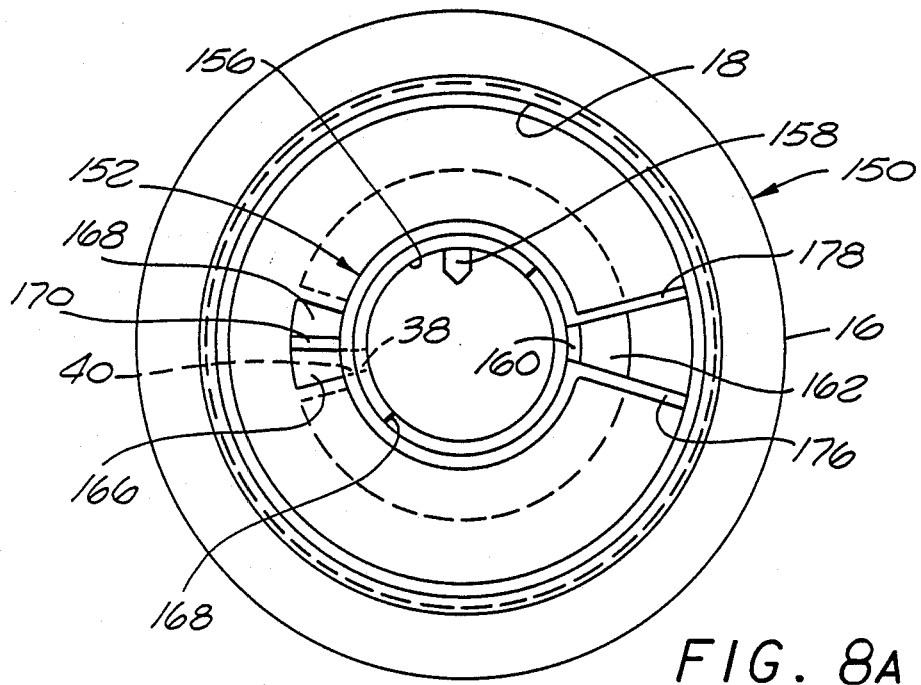
FIG. 8A is a top view of the alternate liquid dispensing apparatus of FIG. 8 with the cap removed from the container.

The removable cup dispensing approach as used with container 62 depicted in FIG. 3 and discussed above is only able to dispense measured amounts up to about one-half of the volume of compartment 14. FIGS. 7, 8 and 8A depict removable cup designs that allow dispensing of measured amounts greater than one-half of the volume of compartment 14. These designs share a number of elements with the designs discussed earlier. Similar elements will be designated with the same number. Any difference in the function of these similar elements will be discussed. New elements will be assigned new numbers and discussed in detail.

With reference to FIG. 7, an alternate design for a removable cup dispensing apparatus is depicted in the context of an inversion-type container 138. Removable cup 64 fits down into container 138 so that lip 66 rests on the top edge of the mouth of the container. Cup 64 has a skirt 140 that extends down from lip 66 about the periphery of the cup and rests upon an inwardly extending ledge 142. This ledge extends inward from the wall of the container. The outer surface of skirt 140 remains dry so that it can be handled by a user without the user getting liquid on his or her fingers. Cap 20 fits down over the cup and holds the cup in place when it is tightened down.

Cylinders 26 and 24 with holes 38 and 40 therein, respectively, operate in much the same way as in previous designs. Tabs 44 allow cylinder 24 to be rotated about cylinder 26 to align the desired pair of holes. However, wall 22, the bottom of cup 64, has a hollow cylindrical tube 144 open at both ends mounted in a central opening. This tube extends up into the cup to a height above that of cylinders 24 and 26. Air can leave compartment 14 through the aligned holes in cylinders 24 and 26 and tube 144 when container 138 is inverted. Liquid can enter compartment 14 through an opening 146 in the upper side wall of cup 64 when container 138 is inverted. When container 138 is returned to its upright position, the measured amount of liquid in compartment 14 cannot flow back into compartment 12 because of the height of tube 144 and opening 146.

The measured amount of liquid in compartment 14 is set by the height of the aligned holes 38 and 40. When container 138 is inverted, liquid flows through opening 146 and fills up the outer volume of cup 64 until it reaches the level of the aligned holes. At this point, the liquid overflows through the aligned openings into the central volume of the cup beneath the cylinders. When the liquid level in the central volume reaches the opening of tube 144 it stops rising because air and liquid can no longer exchange. The central volume of cup 64 is defined by a cylindrical wall 148 extending down from the inside surface of cap 20 and curving inward to contact the top edge of cylinder 26.

When container 138 is inverted, a certain portion of the central volume is located below the opening of tube 144. The volume of this portion should be sufficient to handle momentary inversions of container 138 followed by return of the container to the upright position before the measurement cycle has been completed. When this happens liquid may get into the central volume and upon reinversion of container 138 to complete the measurement cycle could prevent air and liquid exchange if it were to block tube 144. To prevent this from happening sufficient volume is provided above the tube (below it during inversion) to handle liquid that may accumulate in the central volume without blocking tube 144.

It should be understood that the central volume can be defined in a number of ways. Use of a wall attached to the cap that abuts cylinder 26 is the presently preferred design because the contact of the wall with cylinder 26 will not interfere with the setting of cylinder 24. However, this central volume could also be defined by having cylinder 26 extend up to abut the lower surface of cap 20. Unfortunately, this would make it difficult to get at tabs 44. The central volume could also be defined by having cylinder 24 extend up to abut the lower surface of cap 20. For this to work, however, a system would have to be provided for holding cylinder 24 against rotation while cap 20 was being tightened down. Otherwise, alignment of holes 38 and 40 would be thrown off.

With reference to FIGS. 8 and 8A, another alternate design for a removable cup dispensing apparatus is shown in the context of an inversion-type container 150. This design is a variation of the design depicted in FIG. 7 and is intended to have no central obstructions in the cup so that a user will be more comfortable drinking from the cup. In this design, cup 64 is received into the top of container 150 and has an outer skirt 140 that rests upon inwardly extending ledge 142. Cap 20 fits over the mouth of the container and holds cup 64 in place. As with the designs discussed earlier, the outer surface of skirt 140 will remain dry for the benefit of those handling the cup.

An internal cup 152 is centered within skirt 140 and spaced from the skirt. The internal cup is attached to skirt 140 by a wall 154 extending out from the bottom surface of cup 152. Wall 154 extends around the periphery of cup 152 except for two openings located roughly on opposite sides of cup 152. Holes 40 are located in the wall of cup 152 at various heights. A rotating cylinder 156 is received within cup 152. Holes 38 are located in the wall of cylinder 156 and are positioned so that one of the holes can be aligned with one of the holes 40 upon rotation of cylinder 156 within cup 152. A pointer 158 extends inward from the wall of cylinder 156 adjacent the top edge to provide a means for rotating cylinder 156. Measurement height is adjusted by aligning the desired pair of holes.

The wall of internal cup 152 extends upward to abut the undersurface of cap 20. A rectangular notch 160 is provided at one point in the wall of internal cup 152 and extends downward from the top edge of the cup. Notch 160 is positioned so that it is at the top of a rectangular passageway 162 (FIG. 8A) that extends down along the side of cup 152 to one of the openings in wall 154. Cylinder 156 has a wide rectangular notch 164 extending downward from its top edge to the same depth as notch 160. Notch 164 is wide enough for a part of it to be aligned with notch 160 whenever cylinder 156 is positioned so that one of its holes 38 is aligned with one of the holes 40 in cup 152. Thus, liquid can enter the interior of cup 152, compartment 14, when container 150 is inverted by flowing along passageway 162 and through notches 160 and 164.

Holes 40 in cup 152 are aligned with a rectangular passageway 166 that extends along the side of cup 152 roughly opposite passageway 162. Passageway 166 is closed at the bottom by wall 154. Running side by side with passageway 166 is a passageway 168 that extends down to the other opening in wall 154. Passageways 166 and 168 are separated by a common wall 170 (FIG. 8A) that extends up from wall 154 but does not go all the way up to the lower surface of cap 20. Thus, air can leave the interior of cup 152, compartment 14, when container 150 is inverted through the aligned holes 38 and 40, down passageway 166 and then up passageway 168 to compartment 12 through the opening in wall 154. The measured amount of liquid that flows into compartment 14 is set by which pair of holes 38 and 40 are aligned.

Liquid rises in compartment 14 until it reaches the level of the aligned holes. The liquid then overflows down passageway 166 and rises in the volume outside of cup 152 until passageway 168 is blocked so that air and water can no longer exchange. To account for momentary inversions, skirt 140 defines a volume outside of cup 152 by having a rim 172 that is held away from the undersurface of cap 20 by an upwardly turned lip 174. This volume can hold sufficient liquid around the outside of cup 152 to prevent premature blockage of passageway 168. Walls 176 and 178 (FIG. 8A) extending outward from either side of notch 160 to lip 174 and extending upward from rim 172 to abut the undersurface of cap 20 separate this volume from passageway 162. Thus, the apparatus of FIGS. 8 and 8A functions in much the same way as the apparatus of FIG. 7. When container 150 is returned to the upright position after a measurement cycle, liquid cannot flow back into compartment 12 because of the height of notches 160 and 164 and the height of wall 170.

With reference to FIGS. 9 and 9A, a removable cup dispensing approach is shown in the context of a squeeze-type container 180. As with earlier variations, elements similar to elements of earlier designs will be designated with the same number and new elements will receive a new number. This will help to highlight the specific differences incorporated in this design.

Tube 34 extends up from the bottom of compartment 12 of container 180 to enlarged portion 36. In this design, enlarged portion 36 takes the form of an outer cup that is received down into the mouth of container 180. Outwardly extending lip 182 at the top edge of this outer cup rests on the top edge of the mouth of container 180 and holds the outer cup in place. An inner cup 184 is received down into enlarged portion 36 and has an outwardly extending lip 186 at its top edge that will rest upon lip 182. The bottom surface of cup 184 forms wall 22. Cylinder 24 extends upward into compartment 14 in the interior of cup 184 around a central opening in wall 22. Holes 40 are provided in cylinder 24.

Cylinder 26 is received within cylinder 24 and can rotate with respect to cylinder 24. Holes 38 are provided in cylinder 26. The upper end of cylinder 26 extends upward through a central opening in cap 20 and is attached to a circular dial 188 that rests on the upper surface of cap 20. The lower end of cylinder 26 is open, and a circular disk 190 extends outward from the walls of cylinder 26 adjacent its lower end. Disk 190 is in contact with wall 22. Dial 188 has four holes 192 extending therethrough and equally spaced around the center of the dial (FIG. 9A). Dial 188 can be turned so that one of these four holes will align with a hole 194 extending through cap 20. Three of the holes 192 are labelled with a specific measurement amount to reflect the fact that aligning one of these holes with hole 194 will result in an alignment of a pair of the holes 38 and 40 that will produce the indicated measured amount. The alignment of one of these holes 192 with hole 194 also provides the air vent needed for the squeeze filling of compartment 14 to operate.

The fourth hole 192 is labelled "DISPENSE" to indicate that aligning this hole with hole 194 will result in an alignment of a hole in disk 190 (not shown) with a hole 196 in the bottom of cup 184. After a measured amount of liquid is squeezed into compartment 14, cap 20 is threaded off of container 180. Lifting cap 20 up lifts cup 184 out of the container. Once the removed cup is positioned over a desired receptacle, dial 188 is turned until the hole 192 labelled "DISPENSE" is aligned with hole 194. This aligns the holes at the bottom of cup 184 so that liquid can pour out the bottom of the cup.

With reference to FIG. 10, another variation on removable cup dispensing in the context of an inversion-type container 198 is depicted. Elements in this design that are similar to elements of previous designs will be designated with the same number. New elements in this design will be designated with new numbers and their function described in detail. The intent of this design is to provide the elements for measurement adjustment on the cap so that the removable cup does not look as cluttered as in some of the previous designs.

Cup 64 fits down into the mouth of container 198 until outwardly extending lip 66 rests on the top edge of the mouth of the container. Cap 20 screws down onto container 198 and holds cup 64 in place. Ledge 142 extends inwardly from wall 16 of the container and curves upward to contact the bottom surface of cup 64, wall 22. This keeps the sides and most of the bottom of cup 64 dry for handling. A cylinder 200 extends upward into compartment 14 around a central opening in wall 22. Cylinder 200 has a trough 202 extending around its top edge and a passageway 204 extending down from trough 202 within the wall of cylinder 200 that opens into compartment 12. Passageway 204 has an arcuate cross section because its width extends partially around cylinder 200. A cylinder 206 extends downward from around a central opening in cap 20 and has an inner diameter equal to the outer diameter of cylinder 200. Cylinder 206 extends down to a point where it overlaps cylinder 200.

A dial 208 rests on the upper surface of cap 20 and has a cylinder 210 extending downward from its lower surface with cylinder 206. Cylinder 210 extends downward until it contacts the top edge of cylinder 200 at a point about midway down compartment 14. Cylinder 210 also has an inner sleeve 212 located at its lower end that extends down along the inner surface of cylinder 200 a short way to provide a seal between the two cylinders. For ease of construction and ease in fitting cylinder 210 down onto cylinder 200, the two cylinders may be constructed so that they contact one another at angled edges to provide a seal. Just below cap 20, holes 214 extend through cylinder 206 at points equally spaced about the circumference of the cylinder. Matching holes 216 extend through cylinder 210 so that liquid can flow from compartment 12 through the center of cylinder 200, through the center of cylinder 210 and through holes 216 and 214 into compartment 14 when container 198 is inverted.

A groove 218 extends up the outer surface of cylinder 210 from the lower edge of the cylinder. By turning dial 208, this groove can be lined up with one of a set of holes 220 located at different points around the periphery of cylinder 206 at various different heights. Aligning this groove with one of these holes provides a path for air to escape compartment 14. Air can travel through one of the holes 220, along groove 218, along trough 202 and then along passageway 204 to compartment 12. Trough 202 puts groove 218 in fluid communication with passageway 204 regardless of the orientation of cylinder 210 within cylinder 206. The measurement amount is set by the height of the hole 220 with which groove 218 is aligned. Liquid will fill compartment 14 when container 198 is inverted until it reaches a level where the selected hole 220 is covered. Dial 208 and cap 20 can be provided with markings to aid in selecting a measurement amount.

When container 198 is returned to the upright position after completion of a measurement cycle, cap 20 is screwed off bringing cylinders 206 and 210 up with it. Cup 64 can then be removed from the container and used to dispense the measured amount of liquid. Only measured amounts up to about one-half of the volume of compartment 14 can be dispensed.

Figure 11:
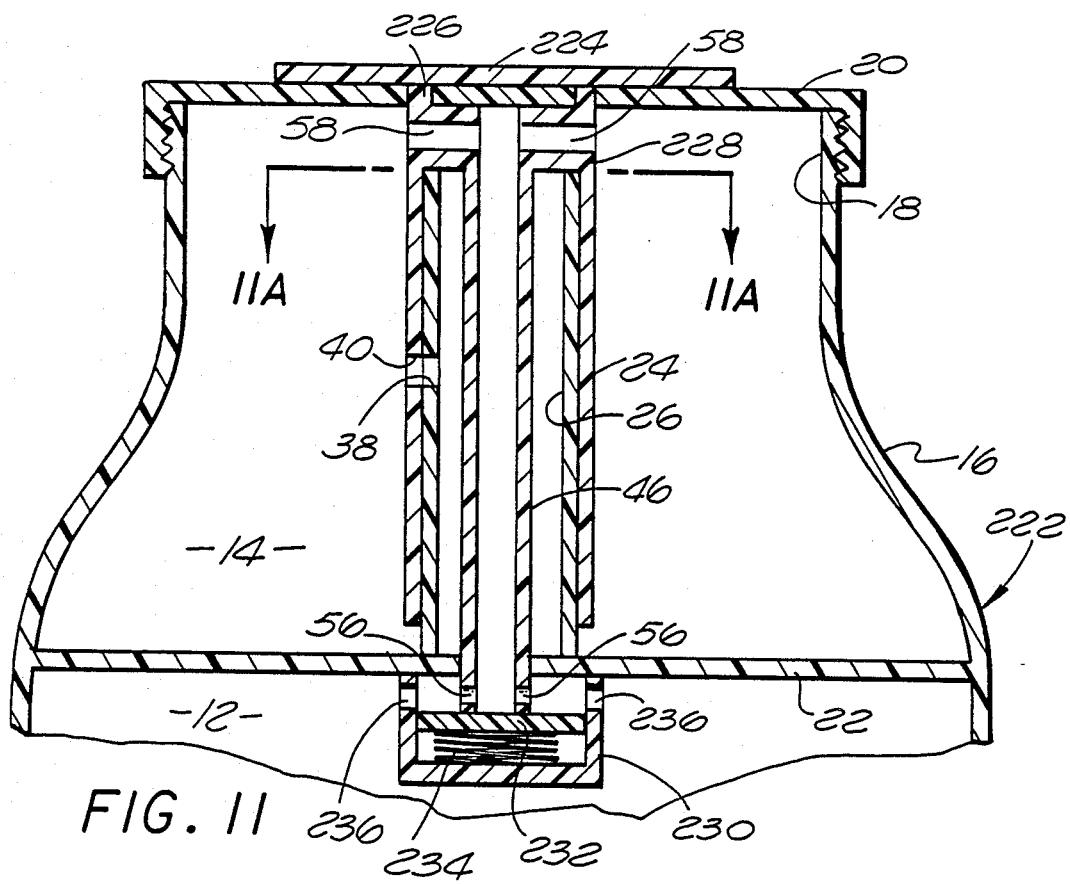
FIG. 11 is a sectioned side view of an alternate embodiment for an inversion-type container using liquid dispensing apparatus according to the present invention.
Figure 11A:
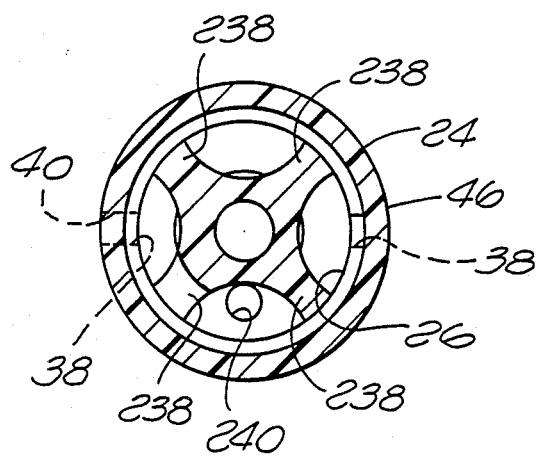
FIG. 11A is a sectioned top view of the container of FIG. 11 along the line 11A—11A.

With reference to FIGS. 11 and 11A, a variation on liquid dispensing apparatus is shown in the context of a two-compartment, inversion-type container 222. The elements of this variation that are similar to elements of prior embodiments have been identified by the same numbers used to identify the elements of the prior embodiments. New elements of this variation are identified by new numbers and their operation described in detail.

Mouth 18 of container 222 is covered by screw cap 20. A dial 224 rests on the top surface of cap 20 and has an arcuate post 226 that extends downward from the lower surface of the dial through an arcuate opening in the cap. Just below the lower surface of cap 20 post 226 is attached to a cylindrical header 228. Cylinder 24 with holes 40 therein extends downward from the outer edge of header 228. A central opening extends vertically down through the header. Cylinder 46 with openings 56 therein, adjacent the cylinders lower end, extends downward from the header around the central opening.

When cap 20 is tightened down, cylinder 46 extends down through a central opening in wall 22. Openings 56 are positioned along the wall of cylinder 46 so that they will be located below wall 22 when the cap is on. A chamber 230 is attached to the lower surface of wall 22 and surrounds its central opening. Disk 232 is received within chamber 230 and held down against the action of coil spring 234 positioned at the bottom of the chamber by the lower end of cylinder 46. Chamber 230 has openings 236 around its side wall that are above disk 232 when it is held down. Thus, when the cap is on and container 222 is inverted, liquid from compartment 12 can flow through openings 236, through openings 56 and up the inside of cylinder 46. Openings 58 extending horizontally through header 228 to contact its central opening then provide pathways for liquid to exit cylinder 46 into compartment 14.

Cylinder 26 with holes 38 therein is slidably received within cylinder 24. Alternatively, the design could be adapted so that cylinder 26 is attached to cap 20 while cylinder 24 is attached to dial 224. A quartet of walls 238 extend radially outward from the wall of cylinder 46 to contact the inner wall of cylinder 26 and form four chambers in the volume between cylinder 26 and cylinder 46 (FIG. 11A). The length of cylinder 26 is set so that it extends between the lower surface of header 228 and the upper surface of wall 22 when cap 20 is tightened down. One of the walls 238 has a notch in its upper end so that air can flow through the aligned holes 38 and 40, up the chamber they line up with, over the notch in the wall 238 and down the adjacent chamber. A hole 240 through wall 22 and positioned to be at the bottom of the adjacent chamber allows the air to exit into chamber 230 where it can enter compartment 12 through openings 236.

Thus, liquid and air can exchange when container 222 is inverted to deliver a measured amount of liquid to compartment 14. When cap 20 is removed for dispensing of the measured amount of liquid, disk 232 can move up against wall 22 to block all the openings therein and prevent any additional liquid from compartment 12 from entering compartment 14.

Preferred embodiments of apparatus for dispensing measured amounts of liquid have been described in the context of squeeze-type and inversion-type containers. In addition, a number of alternate embodiments have been described clearly illustrating the numerous modifications that are possible without departing from the spirit and scope of the present invention. However, these modifications should not be considered exhaustive. Rather, the present invention should be accorded a scope commensurate with the following claims.

What is claimed is:

1. An apparatus for dispensing various measured amounts of liquid from a container, comprising:
   a storage compartment in the container capable of holding a volume of a liquid;
   a dispensing compartment in the container capable of holding various measured amounts of liquid;
   means for causing a selected one of a plurality of different measured amounts of liquid to flow from the storage compartment to the dispensing compartment;
   means for dispensing a selected measured a amount of liquid from the dispensing compartment, said dispensing means including a movable member for opening a dispensing port during dispensing; and
   means for preventing any remaining liquid in the storage compartment from flowing into the dispensing compartment during dispensing, said means for preventing being manipulatively connected to said movable member.

2. An apparatus according to claim 1 wherein the means for causing the measured amount of liquid to flow comprises:
   conduit means in fluid communication with the storage compartment extending up into the dispensing compartment and having at least one opening therein at a predetermined height; and
   means for allowing air displaced from the dispensing compartment by the measured amount of liquid to vent from the dispensing compartment.

3. An apparatus according to claim 2 wherein the means for causing the measured amount of liquid to flow includes means for allowing liquid to flow from the storage compartment to the dispensing compartment when the container is inverted; wherein said means for allowing air to vent from the dispensing compartment is blocked by liquid when the measured amount of liquid has flowed into the dispensing compartment.

4. An apparatus according to claim 1, wherein manipulation of said movable member to open said dispensing port automatically causes the means for preventing to prevent liquid in the storage compartment from flowing into the dispensing compartment.

5. An apparatus according to claim 4 wherein the movable member comprises a cap and the means for preventing liquid in the storage compartment from flowing into the dispensing compartment comprises a valve member, wherein said valve member is manipulatively connected to said cap such that as the cap is moved to unblock the opening, the valve member is simultaneously moved to a position closing off the dispensing compartment from the storage compartment.

6. An apparatus according to claim 4 wherein the movable member is selected from the group consisting of a flip top, pull top, and screw cap.

7. An apparatus according to claim 3 wherein a portion of said dispensing compartment defines a volume for holding an unmeasured amount of liquid accumulated in the dispensing compartment during inversion of the container for a time period less than that required for said measured amount to flow into the dispensing compartment, said volume being sized and located to hold said unmeasured amount of liquid in a sufficient quantity and suitable location for preventing said unmeasured amount from blocking the means for allowing air to vent during a subsequent reinversion of the container.

8. An apparatus according to claim 4 wherein the movable member is a rotating dial with an opening therein that can be rotated into alignment with the dispensing port.

9. An apparatus according to claim 1 further including:
   means for dividing the dispensing compartment from the storage compartment, said dividing means containing at least one aperture therein; wherein the means for preventing liquid in the storage compartment from flowing into the dispensing compartment comprises a disk, said disk being located adjacent said dividing means and containing at least one aperture therein, wherein the at least one aperture in the disk and the at least one aperture in the dividing means can be aligned to place the storage compartment in fluid communication with the dispensing compartment and wherein said disk is attached to the movable member such that alignment of the at least one aperture in the disk with the at least one aperture in the dividing means will automatically cause the movable member to close the dispensing port and such that opening of the dispensing port will simultaneously cause said disk to be moved to a position in which the at least one aperture into the disk and in the dividing means are misaligned and the storage compartment is blocked off from fluid communication with the dispensing compartment.

10. An apparatus according to claim 2 wherein the means for selectively preventing any remaining liquid in the storage compartment from flowing comprises means for removably blocking the conduit means.

11. An apparatus according to claim 9 wherein the movable member comprises a dial.

12. An apparatus according to claim 1 wherein the means for causing a measured amount of liquid to flow from the storage compartment comprises first and second hollow cylinders located substantially in the dispensing compartment wherein said first cylinder has at least one opening along its periphery and said second cylinder has at least one opening along its periphery, said second cylinder being received within said first cylinder such that one cylinder an be rotated relative to the other cylinder, whereby any one of the at least one opening in the second cylinder can be aligned with at least one opening in the first cylinder to selectively determine a measured amount.

13. An apparatus according to claim 12 wherein said second cylinder has a single opening along its periphery, and said first cylinder a single opening along its periphery, whereby the measured amount of liquid is selectively determined by overlapping said opening in the first cylinder with the opening in said second cylinder.

14. An apparatus according to claim 13 wherein the opening of the second cylinder is a vertically oriented slot and the opening of the first cylinder has a lower edge set angularly with respect to said slot.

15. An apparatus for dispensing a measured amount of liquid from a container, comprising:
- a storage compartment in the container capable of holding a volume of liquid;
- a dispensing compartment in the container including a removable cup capable of holding at least the measured amount of liquid;
- means for allowing a measured amount of liquid to flow from the storage compartment to the dispensing compartment;
- an opening to the outside of the container through which the removable cup can be removed from the container while containing the measured amount of liquid; and
- means for removably covering the opening to the outside, wherein the removable cup containing the measured amount of liquid is removed from the dispensing compartment in order to dispense said measured amount.

16. An apparatus according to claim 15 wherein said removable cup comprises a drinking cup.

17. An apparatus according to claim 16 wherein said removable cup is situated within the dispensing compartment such that said cup is shielded from liquid wetting the exterior of the cup.

18. An apparatus according to claim 16 including means for shielding said cup while the cup is within the dispensing compartment, said means for shielding preventing liquid form wetting the exterior of the cup.

19. An apparatus according to claim 15 wherein said removable cup includes hand holds for removing the cup from the dispensing compartment.

20. An apparatus according to claim 15 wherein various measured amounts can be dispensed by said removable cup, said cup having first and second hollow cylinders, each cylinder having at least one opening along its periphery, said second cylinder being received within said first cylinder such that one cylinder can be rotated relative to the other cylinder, whereby any one of the at least one opening in the second cylinder can be aligned with at least one opening in the first cylinder to selectively determine a measured amount.

21. An apparatus according to claim 20 wherein the removable cup includes a dispensing hole which is selectively covered and uncovered by movement of a dial.

22. An apparatus according to claim 20 wherein the container is inverted to allow a measured amount of liquid to flow from the storage compartment to the dispensing compartment.

23. An apparatus according to claim 15 wherein the removable cup includes a central first inner cylinder with a trough around a top edge of said cylinder and an air passage-way extending down from the trough, through the cylinder and opening into the storage compartment;
- wherein the means for removably covering the opening includes a cap having a downwardly projecting outer cylinder with at least one opening along its periphery, said cap having a dial provided with a downwardly projecting second inner cylinder, said second inner cylinder having a groove in its outer surface, whereby the measured amount is set by movement of said dial to selectively align said groove to match an opening in said outer cylinder; and
- wherein said cap fits onto said cup such that the first inner cylinder of the cup is situated between the outer cylinder and the second inner cylinder such that the trough connects the groove in fluid communication with the air passageway regardless of the orientation of the second inner cylinder within the outer cylinder, so that air displaced from the dispensing compartment by fluid can escape the dispensing compartment through a path including the groove, the trough and the air passageway.

24. An apparatus according to claim 15 wherein various measured amounts can be dispensed by the removable cup, wherein the means for allowing the measured amount of liquid to flow from the storage compartment to the dispensing compartment includes a cylinder which extends from the storage compartment into the interior of the removable cup, said cylinder having an open top and being movable relative to said cup whereby said cylinder is selectively movable to various heights within said cup such that the height of the cylinder extending into the cup will determine the measured amount, wherein liquid flows form said storage compartment, through said cylinder and into said cup.

25. An apparatus according to claim 24 wherein the container is inverted to allow a measured amount of liquid to flow from the storage compartment to the dispensing compartment.

26. An apparatus according to claim 15 wherein various measured amounts can be dispensed by the removable cup, wherein the means for allowing the measured amount of liquid to flow from the storage compartment to the dispensing compartment includes a cylinder which extends into the interior of the removable cup, said cylinder having an open top and being movable relative to a cylindrical side wall of said cup, whereby said cylinder is selectively movable to various positions within said cup such that the position of the cylinder relative to the side wall of the cup will determine the measured amount, wherein liquid flows from said storage compartment, through said cylinder and into said cup.

27. An apparatus for dispensing various measured amounts of liquid form a container, comprising:
- means defining a storage compartment in the container capable of holding a volume of liquid;
- means defining a dispensing compartment in the container capable of holding various measured amounts of liquid;
- means defining a flow path between the storage and dispensing compartments;
- means for delivering a selected one of the various measured amounts through the flow path to the dispensing compartment; and
- means for dispensing the selected measured amount of liquid through a dispensing path, said means for dispensing including a movable control member which is movable between a first position and a second position, wherein movement of said control member to said first position closes said dispensing path and simultaneously opens said flow path and wherein movement of said control member to said second position opens said dispensing path and simultaneously closes said flow path.

28. An apparatus as in claim 27 wherein said means for delivering a selected one of the various measured amounts includes first and second hollow cylinders located substantially within the dispensing compartment, each cylinder having at least one opening along its periphery, said second cylinder being received within said first cylinder such that one cylinder can be rotated relative to the other cylinder, whereby any one of the at least one opening in the second cylinder can be aligned with at least one opening in the first cylinder to selectively determine a measured amount.

29. An apparatus according to claim 27 wherein the means for delivering a selected one of the various measured amounts includes a storage compartment which is squeezed to cause liquid to flow from said storage compartment to said liquid compartment.

30. An apparatus for dispensing various measured amounts of liquid, comprising:
a bottle providing a liquid storage compartment;
a removable cup capable of holding various measured amounts of liquid;
a cap which fits onto said bottle and cooperates with said cup to define a dispensing compartment, said cap being removable to expose said cup for removal of said cup from the bottle while said cup contains a selected measured amount of liquid;
means for delivering a selected one of a plurality of different measured amounts of liquid from said storage compartment to said dispensing compartment; and
means defining a flow path from said storage compartment to said dispensing compartment.

31. An apparatus as in claim 30 wherein the removable cup includes a central first cylinder which provides an air passageway placing said first cylinder in fluid communication with said storage compartment;
wherein said cap provides a downwardly projecting second cylinder with at least one opening along its periphery, said cap having a dial provided with a downwardly projecting inner cylinder, said inner cylinder being received within said second cylinder such at one cylinder can be rotated relative to the other cylinder, said inner cylinder having at least one opening along its periphery, whereby one of a plurality of different measured amounts of liquid is selected by movement of said dial to selectively align the at least one opening in the inner cylinder with at least one opening in the second cylinder.

32. An apparatus according to claim 31 wherein the inner cylinder has a single opening along its periphery which is a vertically oriented slot, and the second cylinder has as single opening along its periphery which has a lower edge set angularly with respect to said slot, whereby a selected amount of overlap if said opening in the second cylinder with said slot determines a selected one of the plurality of different measured amounts.

33. An apparatus as in claim 30 including means for allowing air displaced from the dispensing compartment by a measured amount of liquid to vent form the dispensing compartment, wherein said bottle is inverted to cause the measured amount of liquid to flow from said storage compartment to said dispensing compartment, and wherein a portion of said dispensing compartment defines a volume for holding an unmeasured amount of liquid accumulated in the dispensing compartment during inversion of the container for a time period less than that required for said measured amount to flow into the dispensing compartment, said volume being sized and located to hold said unmeasured amount of liquid in a sufficient quantity and suitable location for preventing said unmeasured amount from blocking the means for allowing air to vent during a subsequent reinversion of the container.

34. An apparatus as in claim 30 wherein the means for delivering a selected one of a plurality of different measured amounts of liquid includes a cylinder which extends from the storage compartment into the interior of the removable cup, said cylinder having an open top and being movable relative to said cup whereby said cylinder is selectively movable to various heights within said cup such that the height of the cylinder extending into the cup will determine the selected measured amount, wherein liquid flows from said storage compartment, through said cylinder and into said cup.

* * * * *